(12) United States Patent
Yomkil et al.

(10) Patent No.: US 10,507,762 B2
(45) Date of Patent: Dec. 17, 2019

(54) ELECTRONIC ASSEMBLY FOR ILLUMINATING A TARGET AREA MARKING A DETECTION AREA OF A SENSOR

(71) Applicant: HUF HÜLSBECK & FÜRST GMBH & CO. KG, Velbert (DE)

(72) Inventors: Malabo Yomkil, Essen (DE); Bernd Ette, Wolfsburg (DE); Stefan Moenig, Schwelm (DE); Helmut Schumacher, Coesfeld (DE); Nadine Sticherling, Essen (DE); Iko Lindic, Essen (DE); Norbert Heller, Grefrath (DE); Alexander Ziegler, Wuelfrath (DE); Christof Hache, Velbert (DE); Oliver Mueller, Velbert (DE); Mirko Schindler, Velbert (DE)

(73) Assignee: Huf Huelsbeck & Fuerst GmbH & Co. KG, Velbert (DE)

( * ) Notice: Subject to any disclaimer, the term of this patent is extended or adjusted under 35 U.S.C. 154(b) by 0 days.

(21) Appl. No.: 15/311,483

(22) PCT Filed: Mar. 27, 2015

(86) PCT No.: PCT/EP2015/056761
§ 371 (c)(1),
(2) Date: Nov. 15, 2016

(87) PCT Pub. No.: WO2015/172934
PCT Pub. Date: Nov. 19, 2015

(65) Prior Publication Data
US 2017/0088042 A1 Mar. 30, 2017

(30) Foreign Application Priority Data

May 16, 2014 (DE) .......................... 10 2014 106 939

(51) Int. Cl.
*B60Q 1/50* (2006.01)
*B08B 3/02* (2006.01)
(Continued)

(52) U.S. Cl.
CPC .................. *B60Q 1/50* (2013.01); *B08B 3/02* (2013.01); *B60Q 1/24* (2013.01); *F21V 5/04* (2013.01);
(Continued)

(58) Field of Classification Search
CPC .... B08B 3/02; B60Q 1/24; B60Q 1/26; B60Q 1/32; B60Q 1/343; B60Q 1/50;
(Continued)

(56) References Cited

U.S. PATENT DOCUMENTS

| | | | | |
|---|---|---|---|---|
| 3,913,840 A | * | 10/1975 | Kato | B05B 1/10 134/199 |
| 5,008,595 A | * | 4/1991 | Kazar | H05B 33/0803 315/178 |

(Continued)

FOREIGN PATENT DOCUMENTS

| | | |
|---|---|---|
| JP | H 11-321440 A | 11/1999 |
| JP | 2006-90033 A | 4/2006 |

(Continued)

OTHER PUBLICATIONS

International Search Report of International Application No. PCT/EP2015/056761 dated Jul. 17, 2015, 4 pages.
(Continued)

*Primary Examiner* — Bryon T Gyllstrom
(74) *Attorney, Agent, or Firm* — Fay Sharpe LLP

(57) ABSTRACT

An electronic assembly for a motor vehicle includes a housing, a control and evaluation device disposed in the housing which is adapted to be coupled to a control device of the motor vehicle and an illumination device coupled to (Continued)

the control and evaluation device. The illumination device is adapted to be actuated by the control and evaluation device. A target area characterizing a detection area outside of the housing can be marked by an optical signal. The illumination device is adapted to be activated by the control and evaluation device for emitting light with different colors.

17 Claims, 3 Drawing Sheets

(51) Int. Cl.

| | | |
|---|---|---|
| B60Q 1/24 | (2006.01) | |
| F21V 5/04 | (2006.01) | |
| H05B 33/08 | (2006.01) | |
| H05B 37/02 | (2006.01) | |
| F21Y 113/13 | (2016.01) | |
| F21Y 115/10 | (2016.01) | |

(52) U.S. Cl.
CPC ..... *H05B 33/0872* (2013.01); *H05B 37/0218* (2013.01); *H05B 37/0227* (2013.01); *B60Q 2400/20* (2013.01); *B60Q 2400/40* (2013.01); *F21Y 2113/13* (2016.08); *F21Y 2115/10* (2016.08)

(58) Field of Classification Search
CPC ........... B60Q 2400/20; B60Q 2400/40; B60Q 1/0011; B60Q 1/2619; B60Q 1/323; B60Q 1/346; B60Q 3/258; B60Q 3/267; B60Q 3/80; F21Y 2103/10; F21Y 2105/10; F21Y 2113/13; F21Y 2115/10; H03K 17/955; E05Y 2400/44; E05Y 2400/852
See application file for complete search history.

(56) References Cited

U.S. PATENT DOCUMENTS

| | | | | |
|---|---|---|---|---|
| 5,218,206 A | * | 6/1993 | Schmitt | ............... B60R 16/0237 |
| | | | | 250/339.1 |
| 5,243,185 A | * | 9/1993 | Blackwood | .......... G01N 21/211 |
| | | | | 250/225 |
| 5,652,655 A | * | 7/1997 | Uno | ........................ B60T 8/172 |
| | | | | 356/600 |
| 6,254,259 B1 | | 7/2001 | Kobayashi | |
| 6,260,988 B1 | * | 7/2001 | Misawa | .................... B60Q 1/30 |
| | | | | 362/276 |
| 2003/0031025 A1 | * | 2/2003 | Huizenga | ............. B60Q 1/2669 |
| | | | | 362/501 |
| 2004/0022417 A1 | * | 2/2004 | Nishigaki | .......... B60K 31/0008 |
| | | | | 382/104 |
| 2006/0087231 A1 | * | 4/2006 | Cok | ...................... C03C 17/007 |
| | | | | 313/512 |
| 2009/0018711 A1 | * | 1/2009 | Ueda | ...................... G08G 1/165 |
| | | | | 701/1 |
| 2010/0085175 A1 | * | 4/2010 | Fridthjof | ................. B60T 8/172 |
| | | | | 340/438 |
| 2010/0091272 A1 | * | 4/2010 | Asada | .................. G01N 21/255 |
| | | | | 356/237.2 |
| 2010/0232006 A1 | * | 9/2010 | Sacher | .................... G09F 19/20 |
| | | | | 359/290 |
| 2010/0321946 A1 | * | 12/2010 | Dingman | ............. B60Q 1/2665 |
| | | | | 362/501 |
| 2011/0128741 A1 | | 6/2011 | Tsai | |
| 2011/0266375 A1 | * | 11/2011 | Ono | ...................... B60S 1/0848 |
| | | | | 239/589 |
| 2013/0130674 A1 | | 5/2013 | De Wind et al. | |
| 2014/0039766 A1 | | 2/2014 | Miyake et al. | |
| 2015/0226870 A1 | * | 8/2015 | Sieg | .................... B60R 25/2054 |
| | | | | 324/658 |
| 2015/0239391 A1 | * | 8/2015 | Foltin | ................ G06K 9/00798 |
| | | | | 701/49 |

FOREIGN PATENT DOCUMENTS

| | | |
|---|---|---|
| JP | 2007-245939 A | 9/2007 |
| JP | 2010-257832 A | 11/2010 |
| JP | 3164103 U | 11/2010 |
| JP | 2011-016383 A | 1/2011 |
| JP | 2012-219469 A | 11/2012 |
| WO | WO 2014/048762 A1 | 4/2014 |
| WO | WO 2014/0148762 A1 | 4/2014 |

OTHER PUBLICATIONS

International Preliminary Search Report on Patentability of International Application No. PCT/EP2015/056761 dated Dec. 1, 2016, 8 pages.

* cited by examiner

ELECTRONIC ASSEMBLY FOR ILLUMINATING A TARGET AREA MARKING A DETECTION AREA OF A SENSOR

BACKGROUND

The present invention relates to an electronic assembly for a motor vehicle, and in particular an electronic assembly for illuminating a target area marking a detection area of a sensor.

For a contact-less actuation of a door or hatch on a motor vehicle, a user typically executes certain gestures in defined areas of the motor vehicle, in order to initiate an actuation of the door or hatch. Thus, in order to open a hatch of a motor vehicle, the user typically places a foot in the area below the rear bumper, and optionally, executes a lateral movement there as well.

In order to indicate, for the user, the detection area of a sensor that detects the presence of the foot of the user, it is known to mark this area on the ground by means of a lamp, for which, in accordance with the prior art, white light is used.

In particular with an irregular ground surface, e.g. when the motor vehicle is parked on grass, a target area marked with a white light is extremely difficult for a user to detect.

For this reason, the object of the present invention is to provide an electronic assembly which enables a target area to be indicated such that a user can readily recognize it.

BRIEF SUMMARY

The object of the present invention is achieved by means of an electronic assembly according to claim 1. The electronic assembly according to the invention comprises a housing, in which a control and evaluation device is disposed, which can be coupled to a control device of a motor vehicle. The electronic assembly further comprises an illumination device coupled to the control and evaluation device, and which can be controlled therewith, with which a target area characterizing a detection area, lying outside the housing, can be marked by means of an optical signal on the ground surface, wherein the illumination device can be activated according to the invention by the control and evaluation device, in order to emit light of different colors.

It has been demonstrated that in particular with uneven ground surfaces, and with the use of white light for marking/indicating the target area, this white light can only be discerned with difficulty by a user. If the illumination device can be controlled according to the invention to emit light of different colors, and if the illumination device is controlled by the control and evaluation device such that a continuous color change (e.g. between green and red) occurs, the target area can be readily discerned by a user, even on an uneven surface, such that the contact-less actuation of, e.g., the hatch, can be carried out without difficulty.

In a preferred embodiment of the electronic assembly according to the invention, the illumination device can be controlled to emit at least red and green light. It has been demonstrated that a color change in an appropriate color combination can be particularly easily discerned by a user.

In order for the illumination device to be able to emit light of different colors, an appropriate lamp, for example, must be disposed in the illumination device, which can emit a plurality of colors. This lamp is then to be controlled by means of the control and evaluation device, such that the desired change between, e.g., red and green light, is achieved. Appropriate lamps, however, have a relatively weak emission, such that it is provided in a preferred embodiment that the illumination device has at least two lamps, wherein the wavelength ranges emitted by the lamps are different. In order to indicate the target region, the lamps having different wavelength ranges are then alternatingly shut on and off by the control and evaluation device, wherein the frequency of the color change and the duration of the respective light phases can be controlled by the control and evaluation device.

In a particularly economical and energy efficient variation, it is provided that the electronic assembly according to the invention has at least two LED light sources, wherein the wavelength ranges emitted by the LED light sources differ from one another.

As has be indicated above, the nature of the ground surface, onto which the target area is to be projected is decisive in terms of how well a user can discern this target area. In a preferred embodiment of the electronic assembly according to the invention, the electronic assembly comprises a sensor coupled to the control and evaluation device, with which the ground surface in the target area can be detected. In particular, it can be determined how the ground surface is constructed with regard to existing height differences, such that the illumination device can be activated in a manner adapted to the ground surface.

Furthermore, the electronic assembly according to the invention can have an (additional) sensor, with which the brightness in the detection, or target, area can be detected, such that the illumination device can be activated in an optimal manner, depending on the brightness. In a corresponding embodiment, the activation of the illumination device for emitting different colors can thus be adjusted to the brightness conditions, such that it is always possible to mark the target area in an optimal manner.

The two sensors specified above could be implemented by means of a combined sensor, if both variations are to be used.

Depending on the positioning of the electronic assembly in or on the motor vehicle, it is subjected to a more or less strong regular soiling, by means of which the marking of the target area on a ground surface is impaired, because dirt may be deposited on the illumination device.

In a preferred embodiment of the electronic assembly according to the invention, it is therefore provided that the illumination device is allocated a self-cleaning coating, this being in the region of the illumination device, through which the light of the lamp exits from the illumination device (thus in the region of the clear aperture). With a self-cleaning coating, the surface behavior is changed in comparison with a normal "coating," such that it is difficult for dirt to adhere to the coating, and is substantially cleaned thereof when brought in contact with water.

Alternatively or additionally, it is provided in another embodiment that the electronic assembly comprises a nozzle assembly (coupled to the control and evaluation device), via which the illumination device, or the self-cleaning coating, can be sprayed with a cleaning fluid. This cleaning fluid can be water, to which a cleaning solution has been added. The nozzle assembly can be activated as a function of the number of kilometers travelled, or, alternatively, it is conceivable that the nozzle assembly is activated at the same time that the wiper spray for the rear window is actuated, or when the user exits the vehicle.

BRIEF DESCRIPTION OF THE DRAWINGS

The invention shall be explained below based on preferred embodiments, which are depicted in the attached drawings, wherein.

DETAILED DESCRIPTION

Figure 1:
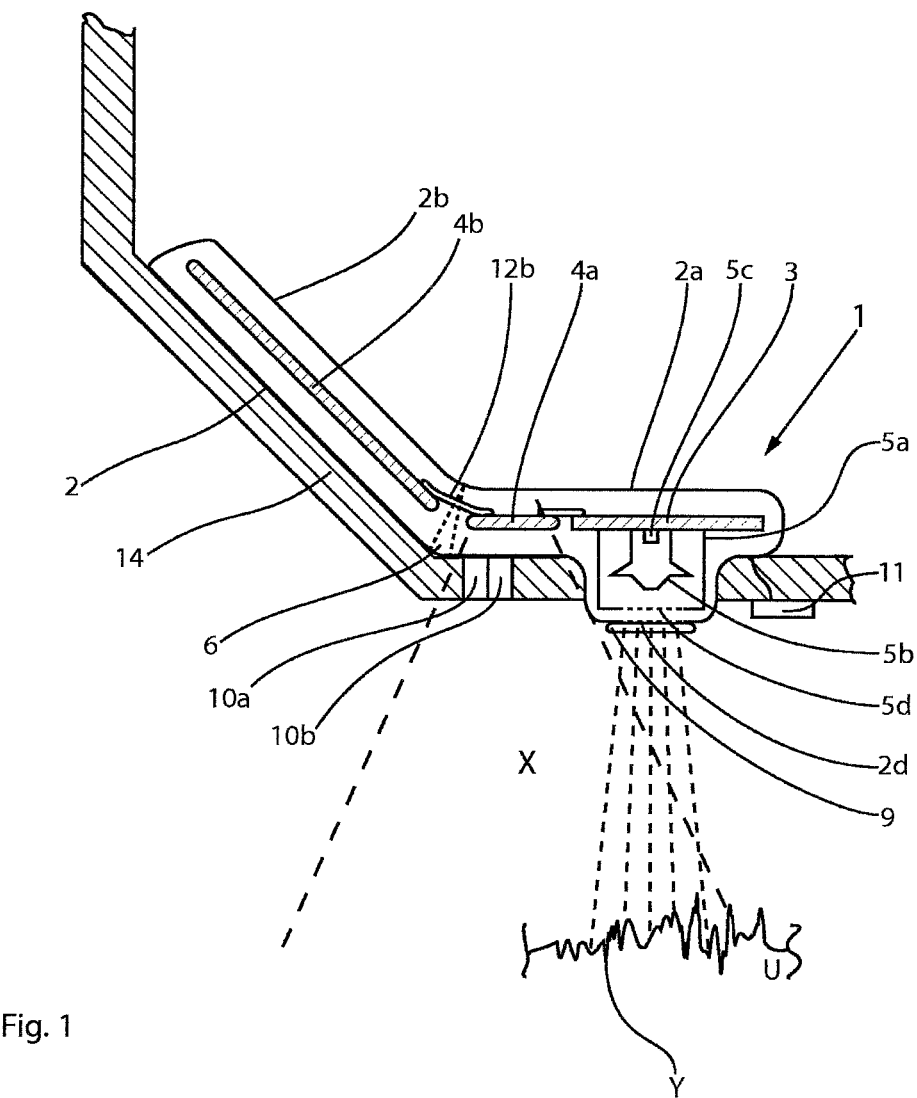
FIG. 1 shows a side view of a first embodiment of the electronic assembly according to the invention.

FIG. 1 shows a lateral sectional view of a first embodiment of the electronic assembly 1, wherein the electronic assembly is attached to a body part 14 of a motor vehicle. In the illustrated embodiment, the electronic assembly comprises a housing 2, having two housing sections 2a and 2b, which are connected to one another via an articulated region 6.

In accordance with the first embodiment, various different components are disposed in the two housing sections 2a, 2b of the electronic assembly according to the invention. A control and evaluation device 3, as well as an illumination device 5a coupled to the control and evaluation device, are disposed in the housing section 2a. The illumination device 5a comprises a lamp 5c in this embodiment. The illumination device 5a also comprises a transparent aperture 5b, through which light emitted from the lamp 5c can pass. A target area Y is marked on a ground surface U by means of the lamp 5c. A lens assembly 5b is allocated to the illumination device 5a, which is disposed in the illumination device. The lens assembly 5b is selected, depending on the spacing between the lamp 5c and the ground surface U, such that an optimal focusing of the light on the ground surface is always ensured. A self-cleaning coating 9 is also allocated to the illumination device.

Furthermore, a first capacitive sensor 4a is disposed in the housing section 2a, which monitors a detection area X. The first capacitive sensor and the illumination device are disposed such that they are aligned with one another, such that the target area Y projected onto the ground surface with the illumination device 5a is at least partially covered by the detection area X of the first capacitive sensor. The target area projected onto the ground surface thus effectively indicates the region to a user, in which an actuation can be initiated beneath the motor vehicle.

In accordance with the invention, the illumination device is designed such that it can be activated by the control and evaluation circuitry, in order to emit light of different colors. For this, the illumination device comprises two light sources, for example, which either emit light of different wavelengths, or wavelength ranges, respectively, or to which an appropriate filter is assigned, respectively. In order to ensure that the target area can be readily discerned by the user, the lamp 5c is activated by the control and evaluation circuitry, such that a repeated, abrupt transition between the different colors occurs, e.g. with a frequency of 30 Hz. A "flickering" of this type in the target area is clearly more readily discerned by a user on an uneven ground surface than a target area that is marked only with white light.

In the illustrated embodiment, the illumination device comprises only one lamp 5c, which can be appropriately activated, i.e. is capable of emitting light of different colors. For this, the lamp comprises two light sources, for example, which emit light of different colors.

In the illustrated embodiment, the electronic assembly further comprises a first sensor 10A, which is coupled to the control and evaluation device 3, and is disposed in a recess in the body part 14. The nature of the ground surface U can be determined with the sensor, and an optimal activation of the illumination device can occur, depending on the this nature of the ground surface, by means of the control and evaluation device, such that an optimal marking is always ensured for the user, depending on the ground surface that has been detected.

The electronic assembly further comprises a second sensor 10b, with which the brightness of the region beneath the illumination device 5a is determined. Depending on the detected brightness, the optimal marking of the target area can then be set using the control and evaluation device (e.g. the changing frequency between the colors or the colors themselves, if more than two different colors can be emitted).

Furthermore, a nozzle assembly 11 is attached to the body part in the first housing section 2a, with which the area of the illumination device through which light exits the illumination device can be cleaned.

In the illustrated embodiment, the electrical assembly furthermore comprises a second housing section 2b, in which a second capacitive sensor 4b is disposed, with which a second (not depicted) detection area can be monitored. It should be noted that, with regard to the two sensors, these can also be omitted in other embodiments, and that they are not in and of themselves substantial components of the assembly according to the invention.

Figure 2:
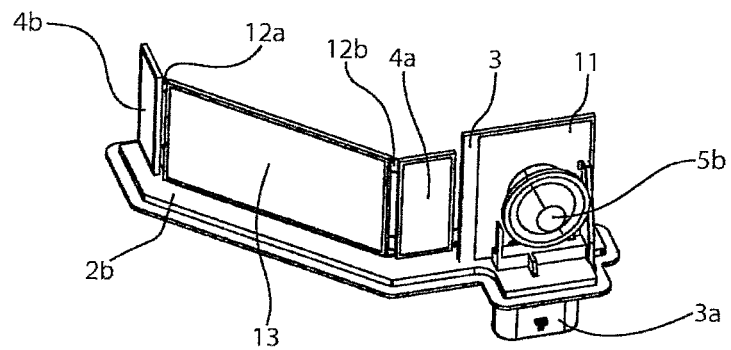
FIGS. 2 and 3 show diagonal views of a second embodiment, wherein in both figures the housing is omitted, and in FIG. 3, the housing and a part of the illumination device is omitted.
Figure 3:
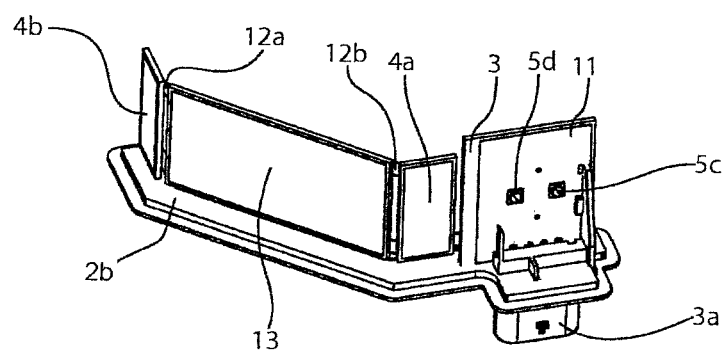

FIGS. 2 and 3 show side views of a second embodiment of the electronic assembly, wherein, for illustrative purposes, the housing is omitted in FIG. 2, and the housing and a portion of the illumination device are omitted in FIG. 3.

In the second exemplary embodiment, two capacitive sensors 4a and 4b are spaced apart from one another by a spacer 13, wherein the spacer is coupled to the first and second capacitive sensors via coupling elements 12a, 12b, thus establishing a connection between the two sensors and the control and evaluation circuitry.

The illumination device 5a according to this embodiment differs from the first embodiment in that this embodiment comprises two lamps 5c, 5d, wherein the two lamps emit light of different wavelength ranges, or of different colors. If the illumination device can "only" emit two colors, these are preferably red and green, because a change between these colors is particularly easy for a user to discern.

In alternative embodiments, the illumination device may have numerous lamps, such that complex color changes may be used to indicate the target area. A "color organ" of this type can, optionally, be adapted individually to the user via the coupling of the control and evaluation device with a control device inside the vehicle.

Figure 4:
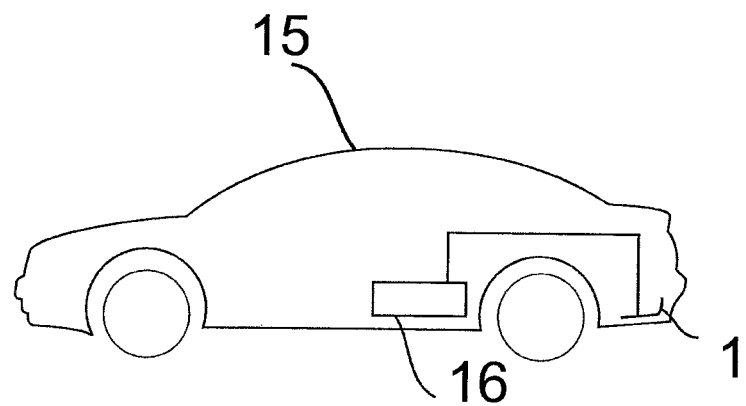
FIG. 4 shows a schematic view of a motor vehicle with a control device according to the invention.

FIG. 4 is a schematic view of a motor vehicle 15 which includes a control device 16 that is coupled to the electronic assembly 1.

The invention claim is:

1. An electronic assembly for a motor vehicle, including a housing, a control and evaluation device disposed in the housing, wherein the control and evaluation device is coupled to a control device of the motor vehicle, an illumination device coupled to the control and evaluation device, which is activated by the control and evaluation device, with which a target area characterizing a detection area outside of the housing can be marked by an optical signal, wherein a capacitive sensor that is disposed in the housing monitors the detection area, wherein the capacitive sensor and the illumination device are aligned with one another such that the target area, marked by the optical signal which is projected onto the ground outside the motor vehicle, is at least partially covered by the detection area of the capacitive sensor, wherein the target area is projected onto the ground outside the motor vehicle indicating a region to a user in which region outside the motor vehicle an actuation of the capacitive sensor can be initiated by the user, and wherein the illumination device is activated by the control and evaluation device for emitting light with different colors.

2. The electronic assembly for a motor vehicle according to claim 1, wherein the illumination device is activated for emitting at least red and green light.

3. The electronic assembly for a motor vehicle according to claim 1, wherein the illumination device has at least two lamps, wherein the wavelength ranges emitted by the lamps differ.

4. The electronic assembly for a motor vehicle according to claim 1, wherein the illumination device has at least two LED light sources, wherein the wavelength ranges emitted by the light sources differ.

5. The electronic assembly for a motor vehicle according to claim 1, wherein the control and evaluation device is designed such that the illumination device is activated such that a repeated abrupt transition between different colors occurs with a frequency of 30 Hz.

6. The electronic assembly for a motor vehicle according to claim 1, wherein the assembly includes a second sensor coupled to the control and evaluation device for measuring brightness in the detection area.

7. The electronic assembly for a motor vehicle according to claim 1, wherein a self-cleaning coating is disposed on the illumination device.

8. The electronic assembly for a motor vehicle according to claim 1, wherein the electronic assembly comprises a nozzle assembly, via which the illumination device is sprayed with a cleaning fluid, wherein the nozzle assembly is coupled to the control and evaluation device.

9. The electronic assembly for a motor vehicle according to claim 1, wherein the assembly includes a second capacitive sensor coupled to the control and evaluation device for detecting another target area.

10. The electronic assembly for a motor vehicle according to claim 1 wherein the capacitive sensor detects a change in capacitance of the detection area.

11. The electronic assembly for a motor vehicle according to claim 1 wherein the capacitive sensor does not detect the optical signal.

12. An electronic assembly for a motor vehicle, comprising:
a housing;
a control and evaluation device disposed in the housing, wherein the control and evaluation device is coupled to a control device of the motor vehicle;
an illumination device disposed in the housing and coupled to the control and evaluation device, wherein the illumination device is activated by the control and evaluation device for emitting an optical signal in the form of light with different colors, the light being projected outside the vehicle to mark an area located on a ground surface outside the motor vehicle;
a capacitive sensor disposed in the housing for monitoring a detection area located outside the vehicle;
wherein the illumination device and the capacitive sensor are aligned with one another such that the target area illuminated by the optical signal is at least partially overlapped by the detection area of the capacitive sensor; and
wherein the target area illuminated by the optical signal indicates to a user a region in which an actuation of the capacitive sensor can be initiated by the user.

13. The electronic assembly of claim 12 wherein the illumination device comprises at least two light sources which illuminate in different wavelength ranges.

14. The electronic assembly of claim 13 wherein the control and evaluation device controls the frequency with which the at least two light sources are activated.

15. The electronic assembly of claim 14 wherein the control and evaluation device controls the duration of activation of the at least two light sources.

16. The electronic assembly of claim 12 wherein the at least two light sources comprise LEDs.

17. The electronic assembly of claim 12 wherein the illumination device comprises a lens assembly selected to provide optimal focusing of the light on the ground surface.

* * * * *